United States Patent
Beifus

(10) Patent No.: US 7,535,186 B2
(45) Date of Patent: May 19, 2009

(54) METHODS AND SYSTEMS FOR CONTROLLING OPERATION OF ELECTRONICALLLY COMMUTATED MOTORS

(75) Inventor: Brian L. Beifus, Ft. Wayne, IN (US)

(73) Assignee: Regal-Beloit Corporation, Beloit, WI (US)

( * ) Notice: Subject to any disclaimer, the term of this patent is extended or adjusted under 35 U.S.C. 154(b) by 187 days.

(21) Appl. No.: 11/360,204

(22) Filed: Feb. 23, 2006

(65) Prior Publication Data
US 2007/0194728 A1 Aug. 23, 2007

(51) Int. Cl.
H02P 1/54 (2006.01)

(52) U.S. Cl. .......................... 318/34; 370/313; 370/475

(58) Field of Classification Search .................... 318/34, 318/66, 432, 439, 362; 388/825; 180/443; 370/313, 475
See application file for complete search history.

(56) References Cited

U.S. PATENT DOCUMENTS

| 4,757,241 | A | 7/1988 | Young |
| 5,006,744 | A | 4/1991 | Archer et al. |
| 6,271,638 | B1 | 8/2001 | Erdman et al. |
| 6,369,536 | B2 | 4/2002 | Beifus et al. |
| 6,456,023 | B1 | 9/2002 | Becerra et al. |
| 6,895,176 | B2 | 5/2005 | Archer et al. |
| 7,296,426 | B2 * | 11/2007 | Butler et al. .................. 62/181 |
| 2004/0250964 | A1 * | 12/2004 | Carmen et al. ............. 160/120 |
| 2004/0267385 | A1 * | 12/2004 | Lingemann .................. 700/83 |
| 2006/0117773 | A1 * | 6/2006 | Street et al. .................... 62/213 |

* cited by examiner

Primary Examiner—Walter Benson
Assistant Examiner—Antony M Paul
(74) Attorney, Agent, or Firm—Armstrong Teasdale LLP

(57) ABSTRACT

A method for resolving addressing conflicts between multiple electronically commutated motors communicatively coupled to a system controller is described. The method includes sending a command, from the system controller, to an address and determining, based on responses or lack of a response received at the system controller, a status of the address. The method further includes repeating the sending and determining steps to determine which addresses are not used and which addresses indicate existence of an addressing conflict and sending messages from the system controller to reassign the addresses of at least one of the plurality of motors to an unused address if the status indicates one or more of the addresses have a conflict.

17 Claims, 4 Drawing Sheets

Message Packet Construction

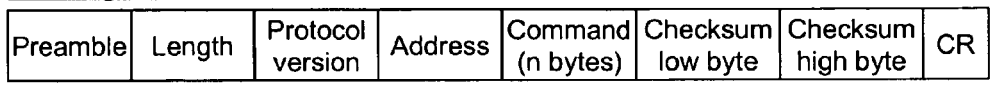

FIG. 3

Set Address

Receive 9 bytes:

ADDR is the old slave address, ADDN is the new address assignment. If the previous command received was not ENUM, then this command is ignored Response 9 bytes:

ADDR is the old slave address, ADDN is the new address.

Set Address Conditional

Receive 9 bytes:

All devices covered by ADDR change address to ADDN if real time counter LS bit is zero. No response if LS bit is one.

Response 9 bytes:

ADDR is the old slave address, ADDN is the new address.

FIG. 4

METHODS AND SYSTEMS FOR CONTROLLING OPERATION OF ELECTRONICALLLY COMMUTATED MOTORS

BACKGROUND OF THE INVENTION

This invention relates generally to operation of electronically commutated motors, which are sometimes referred as brushless DC motors, and more specifically, to methods and systems for controlling operation of electronically commutated motors.

In practice, electronically commutated motors are programmed with a set of operational characteristics. These operational characteristics are typically programmed through a serial interface, before shipment, with data that relates to the desired operational characteristics that coincide with an intended use of the motor. However, these motors, like nearly all other mechanical devices, sometimes fail and need replacement. Field replacement of these programmable motors typically requires that the replacement motor be programmed with the operational characteristics that were programmed into the motor being replaced.

Duplication of operational characteristics from a motor being replaced to a newly installed motor creates a logistics problem relating to a supply of replacement motors. One reason for this logistics problem is that there are many models of electronically commutated motors and most of these models utilize different operational characteristics. Since the programming equipment for these electronically commutated motors is a significant investment, programming of replacement motors is currently performed at a central location rather than at a point of service. The result is that a large number of replacement parts have to be stocked at the central location.

To further illustrate the different operational characteristics and applications where electronically commutated motors can be utilized, a simple residential, commercial, or industrial HVAC system may contain multiple electronically commutating motors, for example, an indoor blower, an outdoor condenser fan, and a combustion draft inducer. Other applications where these electronically commutated motors might be utilized include clean room filter systems, where many blower/filter units are in a ceiling array, and variable air volume boxes for high rise buildings.

BRIEF DESCRIPTION OF THE INVENTION

In one aspect, a method for resolving addressing conflicts between multiple electronically commutated motors communicatively coupled to a system controller is provided. The method includes sending a command, from the system controller, to an address, determining, based on responses or lack of a response received at the system controller, a status of the address and repeating the sending and determining steps to determine which addresses are not used and which addresses indicate existence of an addressing conflict. The method further includes sending messages from the system controller to reassign the addresses of at least one of the plurality of motors to an unused address if the status indicates one or more of the addresses have a conflict.

In another aspect, a motor control system is provided that comprises a system controller and a plurality of electronically commutated motors (ECMs). The ECMs are communicatively coupled to the system controller, and each ECM is assigned to an address. The system controller is programmed to determine if there are addressing conflicts between the plurality of ECMs and further programmed to reassign addresses for those ECMs having an addressing conflict.

In still another aspect, a system controller for a motor control system is provided. The system controller comprises a processor configured for communications with a plurality of electronically commutated motors (ECMs) communicatively coupled thereto, and each ECM is configured with one of a plurality of addresses. The processor is programmed to transmit messages to the plurality of addresses, receive responses to the transmitted messages, determine, from the responses, if there are addressing conflicts associated with the plurality of ECMs, and transmit messages to reassign addresses for those ECMs whose addresses indicated an addressing conflict in the received responses.

BRIEF DESCRIPTION OF THE DRAWINGS

FIG. 3 is an illustration of a communication protocol between the system controller and the motors of FIG. 1.

FIG. 4 is an illustration of commands between a system controller and one or more motors, the commands relating to changing an address of the motors.

DETAILED DESCRIPTION OF THE INVENTION

Motors, for example electronically commutated motors (ECMs), that are part of a network are typically assigned an address. The assignment of an individual address to each motor in the network allows a system controller to communicate with each individual motor utilizing a communications bus. One known method for assigning motor addresses is to incorporate an array of small switches on each motor whose combination determines that motor's address. However, this mechanical method of setting motor addresses is undesirable since every motor address has to be manually set prior to installation. The uniqueness of each motor's address also has to be carefully managed. The herein described methods and systems for electronically assigning and updating of motor addressing allow motors to be installed or replaced without regard for their initial address settings.

Figure 1:
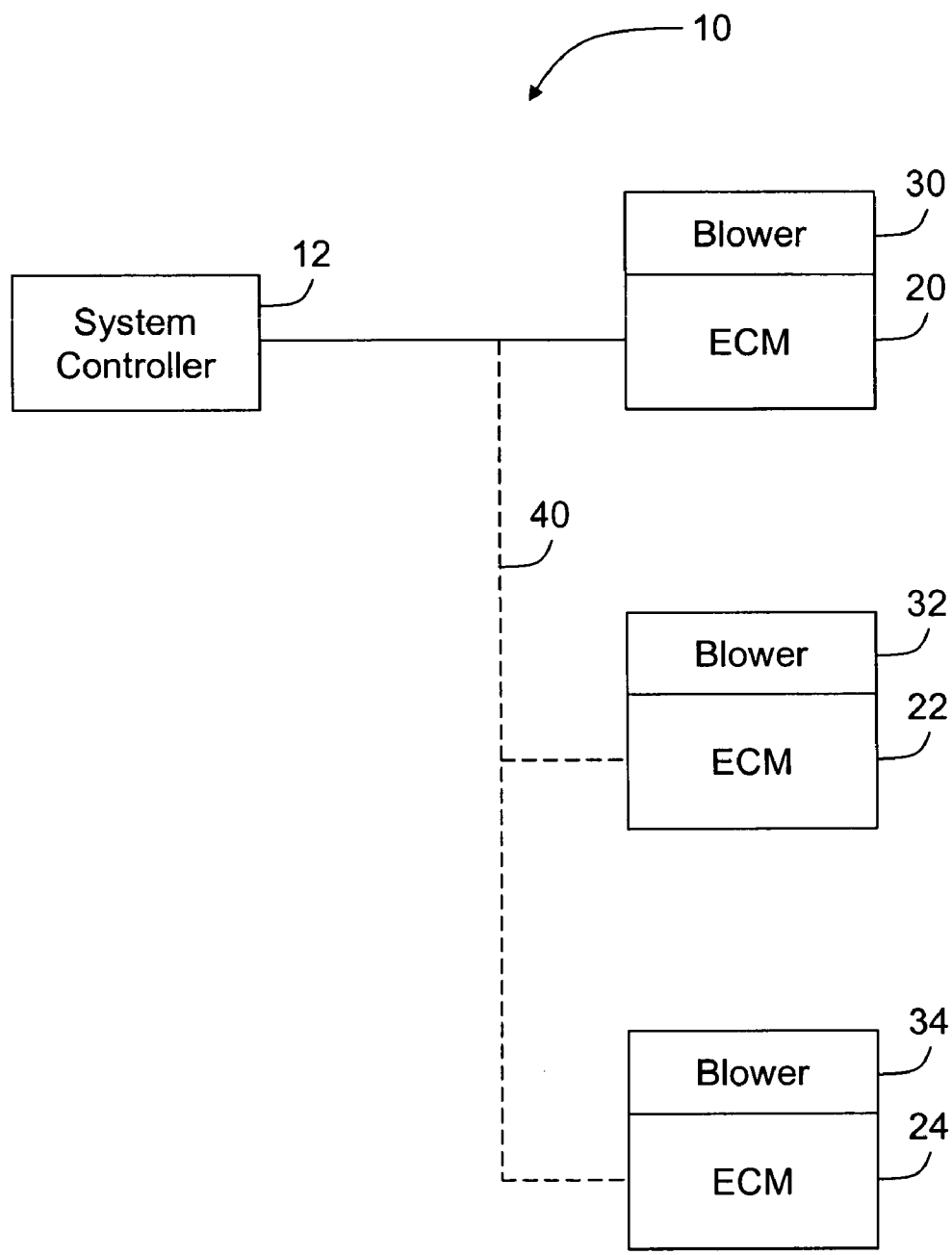
FIG. 1 is a block diagram of a multiple motor system, operation of the motors controlled by a system controller.

FIG. 1 is a block diagram of a multiple motor system 10 including a system controller 12 operable to automatically detect and resolve motor addressing conflicts. As illustrated, multiple motor system 10 also includes a plurality of electronically commutated motors 20, 22, and 24 driving respective blowers 30, 32, and 34. As those skilled in the art will appreciate, multiple motor system 10 may incorporate additional motors driving blowers or motors utilized for other purposes and the three motor/blower configuration of multiple motor system 10 is to be considered illustrative only.

Figure 2:
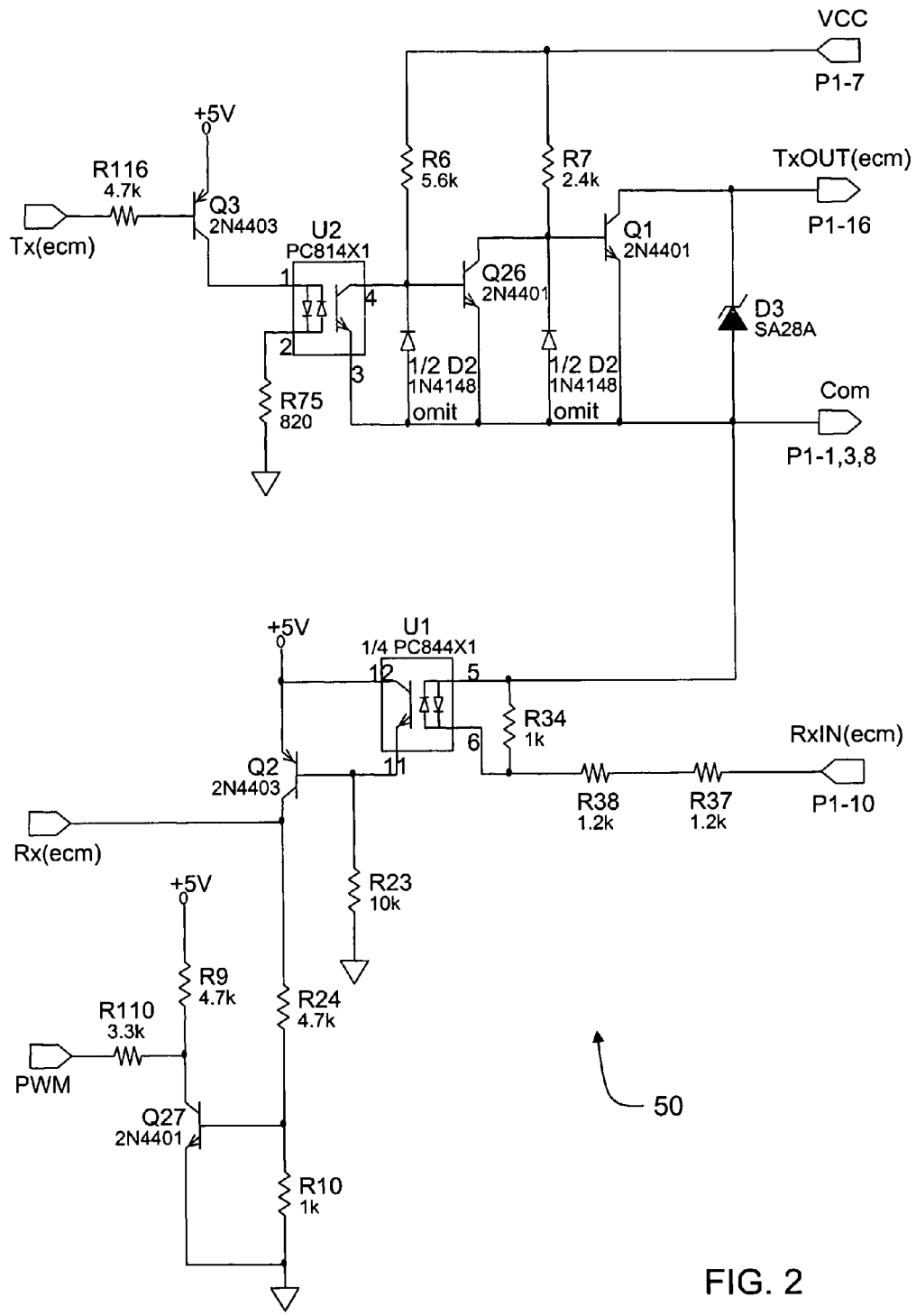
FIG. 2 is a schematic diagram of an interface circuit incorporated into the motors of FIG. 1.

Operation of motors 20, 22, and 24, and consequently blowers 30, 32, and 34, are integrally controlled by system controller 12 through an optically isolated signal interface within each of motors 20, 22, and 24. In one embodiment, the signal interface, described below with respect to FIG. 2, is configured to accommodate serial communications between system controller 12 and microcontrollers within motors 20, 22, and 24 utilizing bus 40. System controller 12 is configured as a master of bus 40 and motors 20, 22, and 24 only respond to commands received from system controller 12. More specifically, system controller 12 initiates all transactions and the motors 20, 22, and 24 only respond to system controller 12.

In one embodiment not shown in FIG. 1, the protocol used for serial communications with system controller 12 includes properties to expand its range of application. More specifically, blowers 30, 32, and 34 may also be connected to system controller 12 as part of a building automation bus. To allow multiple units to be serially connected to system controller 12, an interface circuit capable of allowing communication to the multiple motors and from the individual motors is utilized.

FIG. 2 is a schematic diagram of an optically isolated signal interface 50 that is incorporated in motors 20, 22, and 24, and optionally within blower 30, 32, and 34 (all shown in FIG. 1). Optically isolated signal interface 50 provides a mechanism that allows communications between system controller 12 and the multiple motors shown in FIG. 1. Now referring to signal interface 50, a transmitter node Tx(ecm), is connected to a USART output of the motor's microcontroller (not shown) and a receiver node Rx(ecm) is connected to the microcontroller's USART input. A signal path originating at Tx(ecm) and ending at TxOUT(ecm) comprises a transmitting circuit for messages to be sent by a motor and the signal path originating at RxIN(ecm) to Rx(ecm) comprises the receiving circuit for messages to be received by the motor. These two circuits share a common node (Com), or return to reduce the number of wires within the interface 50.

When system controller 12 begins to transmit a message to one of the motors, RxIN is set to a positive voltage, for example, 12 volts, relative to the common node. The current that flows into an emitter diode of U1 is limited by R38 and R37, and a minimum current threshold is established by R34. An output transistor of U1 is connected to inverting amplifier Q2 such that when RxIN is energized, Q2 turns off and the voltage at Rx(ecm) falls to zero.

When the microcontroller of an electronically commutated motor responds to the received message, Tx(ecm) is brought to a ground potential, turning on Q3 and providing current through the emitting diode of U2. The output transistor of U2 is connected to inverting amplifier Q26 such that when U2 is energized, Q26 turns off and allows base current to flow in inverter Q1, which sinks current to Com. The current into pin TxOUT(ecm) is determined by external circuitry located within system controller 12. Multiple motors can be connected in a multi-drop bus configuration since Q1 is in an off state when the motor is not transmitting. In an alternative embodiment, transmitting and receiving circuits are configured with different reference nodes, rather than the described common point (Com).

Resistors R6 and R7 provide a base drive current for transistors Q26 and Q1 from Vcc, which is connected to a positive DC voltage source provided by system controller 12. Therefore in the described configuration, four wires are required to connect one or more motors to system controller 12. In an alternative embodiment, Vcc is connected to TxOUT, and only three wires are needed to interconnect one or more motors with system controller 12. In this embodiment, circuitry in system controller 12 would be configured to accommodate the three wire configuration.

In a particular embodiment, a series of eight bit bytes are assembled into defined message sequences. System controller 12 generates the command and the message sequence(s) are sent to a motor at a particular address (which is contained in the message sequence). The motor then sends a response, for example, within 100 milliseconds.

FIG. 3 is an illustration of an example embodiment of message packet construction for the multiple motor system 10 of FIG. 1. Each message sequence, or packet, includes bytes representing one or more of: a type of message packet or preamble, a length of the packet, a protocol version, an address to which the message is being sent, a variable length sequence of bytes comprising the command, and two bytes of error detection information such as a checksum. The message sequence ends with a carriage return. In this embodiment, each message 100 contains within it a byte referred to as protocol version (PVER), that represents the revision level of message protocol being used by the sender. The sender of a message adhering to the protocol of message 100 is a system controller, or alternatively a motor responding to a message from a system controller. One function of the revision level data is that it allows a command set to be expanded as the product line matures while providing a mechanism for allowing different revisions of the message sequences to coexist in an end application.

One example where a revision compatibility issue might arise includes a system containing one motor and one system controller where there is a failure of one or the other, and the failed component is replaced with a newer version. The component with the later revision detects the revision level of the other and subsequently uses the earlier protocol to communicate. In another example, a system containing multiple motors and one system controller all connected to one data bus has motors of different revision levels. If any motors are of a level higher than what the system controller is using, these motors limit themselves to the lower version. If the system controller detects a motor with a lower revision protocol, it uses the lower level for all motors, or uses the lower level just for that motor. (Note that addressing individual motors is needed for such two way communications.)

In one specific embodiment, a message protocol for communications between a system controller and one or more motors communicatively coupled to the motor controller provides that each motor has an eight bit address, which is used as illustrated in message 100. In this specific embodiment, two of these addresses are reserved, namely, 255 for new non-configured (not yet addressed motors), and 0 for a broadcast address, leaving 253 unique motor addresses. In an example where two or more motors are configured to have the same address, a command sent by the system controller to that address obtains multiple responses. Such a scenario exists when two or more non-configured motors are placed into service within a system. Alternatively, such a scenario exists when a motor with a pre-existing address is placed into service within a system where another motor is already configured with the same address.

Responses to commands sent by the system controller are distributed randomly within a 100 millisecond window when received by the system controller from the motors. This random distribution occurs since the motors all process and respond to received commands every 100 milliseconds and these responses are not synchronized with one another. In a more likely scenario, the responses from the motors having the same address collide, and since the messages are transmitted with checksums, a collision will be almost certain to cause an invalid checksum. Therefore, if the system controller receives either multiple valid messages, or an incomplete or invalid message, the address to which the system controller sent the message has an addressing conflict.

Conflicts can be detected incidentally, or by a separate enumeration procedure in which the system controller methodically tests each address for its status. At some point, the system controller has at least a partial list of addresses that have conflicts, and a partial list of empty (non-used)

addresses. Once the system controller generates these lists, it can readdress motors with conflicting addresses to non-used addresses.

Now referring to FIG. 4, in a specific embodiment, system controller 12 (shown in FIG. 1) is configured to utilize a set address command 120 that is operable to change the address of any motor at address x (ADDR) to address y (ADDN). Response message 130 is transmitted, for example, a motor at address x in response to its receiving of set address command 120. Additionally, system controller 12 may be configured to utilize a set address conditional command 140 that will do the same address change, for motors at address x (ADDR) but success in using this command is conditional on the state of a counter bit in the motor microcontroller. Response message 150 is transmitted by a motor that receives command 140 and has the counter bit in a state that allows for an address change.

Based on a status of the counter bit, the set address conditional command 140 has approximately a 50% success rate of changing the address of a motor. To resolve addressing conflicts, system controller 12 sends the set address conditional command 140 to the address to move all the motors having the conflicted address to an empty address. Based on counter bit states, on average, roughly half of the motors will be readdressed. The counter bit is used because it is a convenient source of a random one bit number. The counter bit can be utilized in this fashion, in one embodiment, because the counter is counting at a rate that is many orders of magnitude faster than the messaging rate between the controller 12 and the various motors within the system. Additionally, the counter bit is not synchronized with system controller 12, and therefore with regard to the applications described herein, the counter bit functions as, and can be referred to as a random bit. Other sources of a random bit are also contemplated.

System controller 12 is further configured to test either the old address or the new address to see the results. If the outcome is that one motor is left at a previously conflicted address, that is one motor responds to the system controller, then that particular address has been cleaned. If no motors respond, the address is added to the list of empty (non-used) addresses. If the addressing conflict is still present (both motors had there counter bits at the same logic level), the process is repeated. By iteratively moving conflicted motors to known empty addresses, and testing to ensure that motor addresses have been reassigned, eventually all motors within a system will be configured with a unique address.

Figure 5:
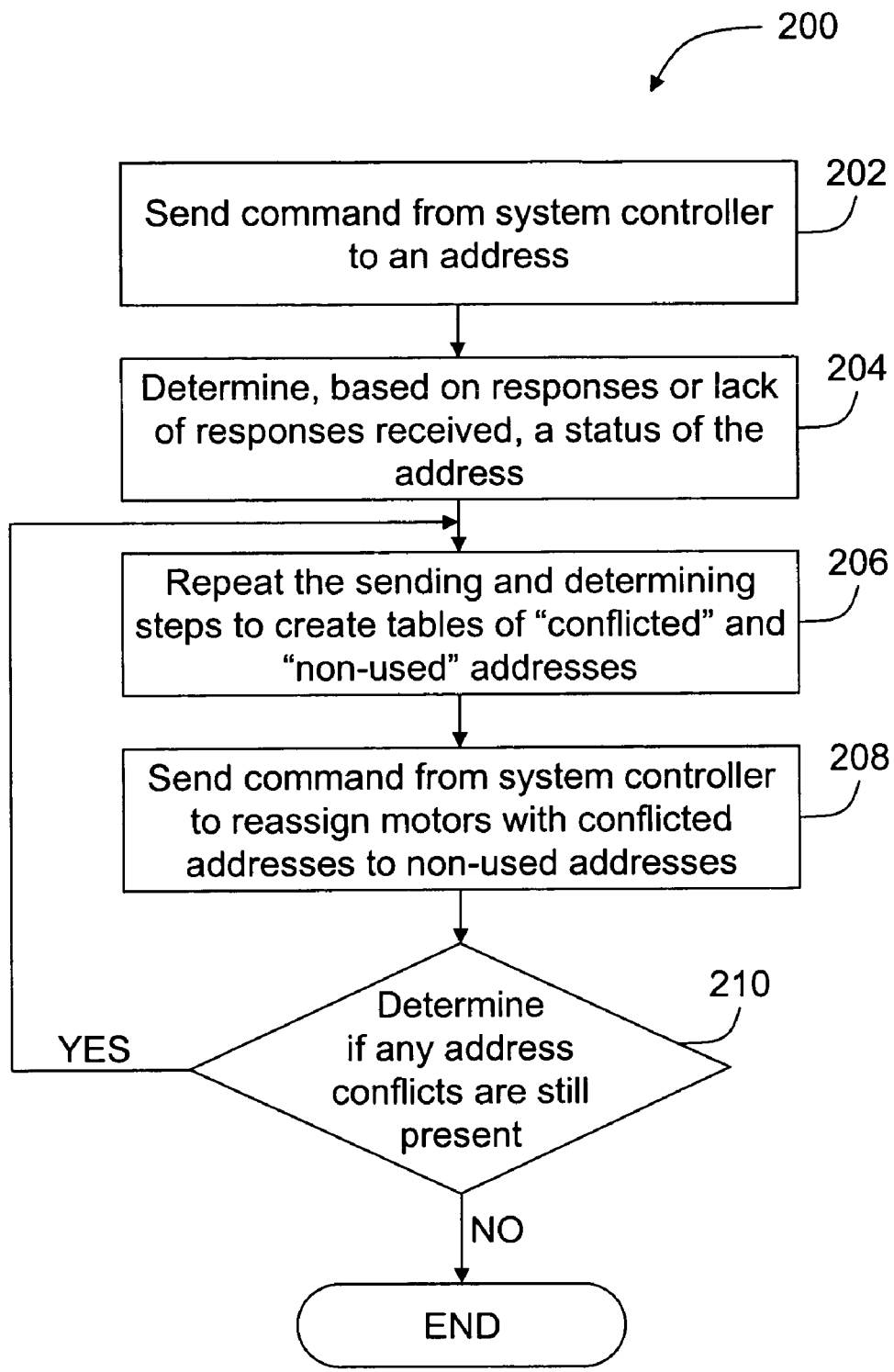
FIG. 5 is a flowchart illustrating a method for resolving addressing conflicts in a multiple motor system.

FIG. 5 is a flowchart 200 illustrating a method for resolving addressing conflicts using the circuits and message protocols above described. Referring to flowchart 200, a command, for example, a configuration message is sent 202 from the system controller to an address. The system controller determines 204, based on the responses received, or lack of responses received, a status for that address.

The sending and determining steps are repeated to create 206 tables of addresses that have conflicts, and addresses that are not used. The system controller then sends 208 commands, using for example, the set address conditional command 140 to one or more conflicted addresses, reassigning those motors to non-used addresses. After sending 208 commands to reassign motor addresses, the system controller then determines 210 if any addresses still have conflicts. As described above, certain motors may not respond to the set address conditional command 140 if the status bit is not in a state that allows the motor to change its address. If no conflicts are found, the process ends and the system controller is able to address each motor in a system separately.

However, if addressing conflicts are still present, the sending and determining steps are repeated to recreate 206 the tables of addresses that have conflicts, and addresses that are not used. The system controller then sends 208 commands, using for example, the set address conditional command 140 to one or more conflicted addresses, reassigning those motors to non-used addresses. This iterative process is repeated, taking into account the status of the above described status bit, until all motors in a system are assigned a unique address.

The above described system, protocol, and methods provide a user with a simple solution to the problems associated with adding motors to a multiple motor control system, and those associated with the replacing of defective units in such a system. Specifically, once addressing conflicts are resolved as described above, a system controller is able to download settings (e.g., operational characteristics) to individual motors from a system controller during normal operation. As such, replacement units do not need to be pre-programmed before being placed into service within such a system. A further result is that fewer types of replacement units are required to be stocked as communicatively coupled motors receive their configuration data from the system controller.

As described above, a residential, industrial, and commercial HVAC systems may contain multiple electronically commutating motors, for example, an indoor blower, an outdoor condenser fan, and a combustion draft inducer. Other applications for electronically commutated motors include clean room filter systems, where many blower/filter units are in a ceiling array, and variable air volume boxes for high rise buildings. In all of these applications, the above described methods and systems for controlling operation of electronically commutated motors provide an advantage in installation and servicing as the motors are configured by, and responsive to, a central controller, which controls fan-out costs associated the controlling of multiple units.

While the invention has been described in terms of various specific embodiments, those skilled in the art will recognize that the invention can be practiced with modification within the spirit and scope of the claims.

What is claimed is:

1. A method for resolving addressing conflicts between multiple electronically commutated motors communicatively coupled to a system controller, each electronically commutated motor comprising a microcontroller, said method comprising:
    sending a command, from the system controller, to an address;
    determining, based on responses or lack of a response received at the system controller, whether the address is being utilized;
    repeating the sending and determining steps to determine which addresses are not used and which addresses indicate existence of an addressing conflict;
    sending conditional commands from the system controller to reassign the addresses of at least one of the plurality of motors to an unused address if the status indicates that one or more of the addresses have a conflict, wherein a success of each of the conditional commands is based on a state of a random bit generated by the microcontroller of the motor receiving the conditional command.

2. A method according to claim 1 wherein determining whether the address is being utilized comprises:
    receiving, at the system controller, at least one of no response messages, multiple valid motor response messages, one or more incomplete motor response messages, and an invalid checksum within a motor response message from a plurality of motors having the same address; and determining if the address has a conflict or if it is an unused address.

3. A method according to claim 1 wherein determining whether the address is being utilized further comprises maintaining a table of unused addresses and a table of addresses having a conflict.

4. A method according to claim 1 further comprising sending a message to the unused address to determine if a motor has been successfully moved to this address.

5. A motor control system comprising:
a system controller; and
a plurality of electronically commutated motors (ECMs) communicatively coupled to said system controller, each ECM assigned to an address, each ECM comprising a microcontroller configured with a random bit, a state of the random bit indicative of whether or not an address of said ECM is capable of being changed, said system controller programmed to:
  determine which addresses are unused and if there are addressing conflicts between said plurality of ECMs, and
  send a message addressed to said ECMs having an address conflict, the message instructing said ECMs to change their address to a new address contained within the message, the change conditional on the state of the random bit.

6. A motor control system according to claim 5 wherein said system controller is configured to iteratively determine if there are addressing conflicts between said plurality of ECMs and reassign addresses for those ECMs having an addressing conflict until it is determined that there are no addressing conflicts between said plurality of ECMs.

7. A motor control system according to claim 5 wherein said system controller is configured to transmit a message to said ECMs having an addressing conflict reassigning those said ECMs to an unused address.

8. A motor control system according to claim 5 wherein said system controller is configured to maintain a table of the unused addresses and a table of addresses having conflicts.

9. A motor control system according to claim 5 further comprising at least one blower communicatively coupled to said system controller, each blower assigned to an address, said system controller programmed to:
  determine if there are addressing conflicts between said plurality of ECMs and said at least one blower; and
  reassign addresses for those ECMs and blowers having an addressing conflict.

10. A motor control system according to claim 5 further comprising a serial interface to communicatively couple said system controller to said motors.

11. A system controller for a motor control system, said system controller comprising a processor configured for communications with a plurality of electronically commutated motors (ECMs) communicatively coupled thereto, each ECM configured with one of a plurality of addresses, each ECM comprising a microcontroller configured to generate a random bit, said processor programmed to:
  transmit messages to the plurality of addresses;
  receive responses to the transmitted messages;
  determine, from the responses, which of the plurality of addresses are unused, and if there are addressing conflicts associated with the plurality of ECMs; and
  transmit messages to reassign addresses for those ECMs whose addresses indicated an addressing conflict in the received responses, a response to the messages to reassign addresses conditional on a state of the random bit.

12. A system controller according to claim 11 wherein said processor is further programmed to transmit messages to and receive messages from the plurality of addresses until it is determined, from the responses, that there are no addressing conflicts.

13. A system controller according to claim 11 wherein said processor is further programmed to maintain a table of the unused addresses and a table of addresses having conflicts.

14. A system controller according to claim 13 wherein to transmit messages to reassign addresses, said processor is configured to transmit a message which changes an address of the ECMs from an address having a conflict to an unused address.

15. A system controller according to claim 14 wherein said processor is configured to:
  transmit a message to the unused address; and
  determine, based on a received message, if one or more ECMs have been successfully moved to this address.

16. A system controller according to claim 14 wherein said processor is programmed to iteratively:
  transmit and receive messages to determine an existence of addressing conflicts; and
  transmit messages to reassign addresses for ECMs having an addressing conflict until it is determined from a content of the received messages that all addressing conflicts have been resolved.

17. A system controller according to claim 11 wherein the messages transmitted to and received from the plurality of addresses comprises data relating to a protocol version, said system controller configured to adapt the transmitted messages to a protocol based on the earliest protocol version data included in the received messages.

* * * * *